US011305616B2

(12) United States Patent
Poolman et al.

(10) Patent No.: US 11,305,616 B2
(45) Date of Patent: Apr. 19, 2022

(54) DUAL COMPRESSOR TRANSPORTATION REFRIGERATION UNIT (71) Applicant: Carrier Corporation, Palm Beach Gardens, FL (US)

(72) Inventors: Ciara Poolman, Syracuse, NY (US); Robert A. Chopko, Baldwinsville, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 58 days.

(21) Appl. No.: 16/315,876

(22) PCT Filed: Jun. 29, 2017

(86) PCT No.: PCT/US2017/039936
§ 371 (c)(1),
(2) Date: Jan. 7, 2019

(87) PCT Pub. No.: WO2018/009406
PCT Pub. Date: Jan. 11, 2018

(65) Prior Publication Data
US 2019/0299751 A1 Oct. 3, 2019

Related U.S. Application Data (60) Provisional application No. 62/358,369, filed on Jul. 5, 2016.

(51) Int. Cl.
B60H 1/32 (2006.01)
F25B 27/00 (2006.01)
B60P 3/20 (2006.01)

(52) U.S. Cl.
CPC ......... B60H 1/3223 (2013.01); B60H 1/3232 (2013.01); B60P 3/20 (2013.01); F25B 27/00 (2013.01); F25B 2400/075 (2013.01)

(58) Field of Classification Search
CPC ..... B60H 1/3223; B60H 1/3232; F25B 27/00; F25B 2400/075; F25B 27/002;
(Continued)

(56) References Cited

U.S. PATENT DOCUMENTS 3,392,541 A * 7/1968 Nussbaum ............... F25B 13/00
62/184
3,719,058 A * 3/1973 Waygood .................. F25B 6/04
62/200

(Continued)

FOREIGN PATENT DOCUMENTS

CN 1213884 A 4/1999
CN 104260618 A 1/2015

(Continued)

OTHER PUBLICATIONS

International Search Report for International Application No. PCT/US2017/039936; International Filing Date Jun. 29, 2017; dated Oct. 11, 2017; 6 Pages.

(Continued)

Primary Examiner — Emmanuel E Duke
(74) Attorney, Agent, or Firm — Cantor Colburn LLP (57) ABSTRACT A transportation refrigeration unit includes an evaporator circulating a flow of refrigerant therethrough to cool a flow of supply air flowing over the evaporator, a first compressor operably connected to an engine and driven by the engine, a second compressor operably connected to a battery and driven by the battery. The first compressor and/or the second compressor are in fluid communication with the evaporator to compress the flow of refrigerant and configured and connected in parallel with one another. A condenser is in fluid communication with the evaporator and the first compressor and/or the second compressor.

11 Claims, 5 Drawing Sheets (58) Field of Classification Search
CPC .... F25B 27/005; B60P 3/20; B60P 2400/075; Y02T 10/166; Y02T 10/90; Y02T 10/7005; B60R 16/033; B60R 16/03
See application file for complete search history.

(56) References Cited

U.S. PATENT DOCUMENTS

| | | | |
|---|---|---|---|
| 3,866,433 A | 2/1975 | Krug | |
| 3,984,224 A * | 10/1976 | Dawkins | B60H 1/3204 62/89 |
| 4,021,214 A | 5/1977 | Bush | |
| 4,489,242 A * | 12/1984 | Worst | B60L 8/003 307/10.1 |
| 4,537,047 A | 8/1985 | Seshadri et al. | |
| 4,682,649 A | 7/1987 | Greer | |
| 4,720,980 A | 1/1988 | Howland | |
| 4,934,158 A | 6/1990 | Sakano | |
| 5,090,209 A * | 2/1992 | Martin | F25D 29/001 62/156 |
| 5,687,579 A * | 11/1997 | Vaynberg | F25B 7/00 62/175 |
| 6,543,243 B2 | 4/2003 | Mohrmann et al. | |
| 6,553,778 B2 * | 4/2003 | Tipton | F25B 39/02 62/196.1 |
| 6,748,750 B2 | 6/2004 | Choi | |
| 6,973,798 B2 | 12/2005 | Ikura et al. | |
| 6,978,630 B2 * | 12/2005 | Wensink | B60H 1/00364 62/175 |
| 7,076,963 B2 | 7/2006 | Higashiyama | |
| 7,107,776 B2 | 9/2006 | Ikura et al. | |
| 7,143,596 B2 | 12/2006 | Yonekura et al. | |
| 7,150,159 B1 * | 12/2006 | Brummett | B60H 1/00378 62/236 |
| 7,350,368 B2 | 4/2008 | Heberle et al. | |
| 8,935,933 B1 | 1/2015 | Koelsch | |
| 2002/0179294 A1 * | 12/2002 | Gupte | F25B 39/04 165/159 |
| 2003/0014992 A1 * | 1/2003 | Grafton | B60H 1/00414 62/244 |
| 2004/0055305 A1 * | 3/2004 | Kuroda | F02N 11/003 60/698 |
| 2004/0168455 A1 * | 9/2004 | Nakamura | B60H 1/004 62/244 |
| 2005/0257545 A1 | 11/2005 | Ziehr et al. | |
| 2007/0131408 A1 | 6/2007 | Zeigler et al. | |
| 2008/0034773 A1 | 2/2008 | Karapetian | |
| 2009/0301125 A1 * | 12/2009 | Myles | B60H 1/00271 62/323.1 |
| 2010/0045105 A1 | 2/2010 | Bovio et al. | |
| 2011/0146314 A1 * | 6/2011 | Tamura | F24F 11/83 62/228.5 |
| 2011/0265506 A1 | 11/2011 | Alston | |
| 2012/0161691 A1 * | 6/2012 | Debesa | F24F 5/0046 320/101 |
| 2012/0319472 A1 | 12/2012 | Arnold | |
| 2014/0020414 A1 | 1/2014 | Rusignuolo et al. | |
| 2015/0121949 A1 * | 5/2015 | Heo | F25B 5/02 62/510 |
| 2018/0087813 A1 * | 3/2018 | Sent, Jr. | F25D 11/003 |

FOREIGN PATENT DOCUMENTS

| | | |
|---|---|---|
| CN | 105627500 A * | 6/2016 |
| DE | 19708533 A1 | 9/1998 |
| DE | 29816787 U1 | 3/2000 |
| EP | 3374705 | 9/2018 |
| FR | 2960949 A1 | 12/2011 |
| JP | 2002127740 A | 5/2002 |
| WO | 2016153841 A1 | 9/2016 |

OTHER PUBLICATIONS

Written Opinion for International Application No. PCT/US2017/039936; International Filing Date Jun. 29, 2017; dated Oct. 11, 2017; 7 Pages.
European Office Action for European Application No. 17 740 178.3; dated Nov. 6, 2020, 9 pages.
Chinese Office Action for Chinese Application No. 201780044790.5; dated Nov. 2, 2021; 13 pages.

* cited by examiner

DUAL COMPRESSOR TRANSPORTATION REFRIGERATION UNIT

CROSS REFERENCE TO RELATED APPLICATIONS

This application is a National Stage application of PCT/US2017/039936, filed Jun. 29, 2017, which claims the benefit of U.S. Provisional Application No. 62/358,369, filed Jul. 5, 2016, both of which are incorporated by reference in their entirety herein.

BACKGROUND

The embodiments herein generally relate to "all electric" transport refrigeration systems and more specifically, the power supplies for such systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

In an all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator.

The diesel engine can cause noise disruption, pollution and over time becomes costly with rising fuel prices. As power and energy requirements for the engine increase, regulation of the engine becomes more strict and engine management systems required also increase, thus increasing cost, complexity and size of the diesel engine and associated components of the transport refrigeration system.

SUMMARY

In one embodiment, a transportation refrigeration unit includes an evaporator circulating a flow of refrigerant therethrough to cool a flow of supply air flowing over the evaporator, a first compressor operably connected to an engine and driven by the engine, a second compressor operably connected to a battery and driven by the battery. The first compressor and/or the second compressor are in fluid communication with the evaporator to compress the flow of refrigerant and configured and connected in parallel with one another. A condenser is in fluid communication with the evaporator and/or the first compressor and the second compressor.

Additionally or alternatively, in this or other embodiments the battery is operably connected to one or more electrically-operated components of the transportation refrigeration unit to drive operation of the one or more components.

Additionally or alternatively, in this or other embodiments the one or more electrically-operated components include an evaporator fan, a condenser fan or a mechanical subcooler.

Additionally or alternatively, in this or other embodiments the battery is configured for recharging via operation of the engine.

Additionally or alternatively, in this or other embodiments the battery is rechargeable via one or more of one or more solar panels operably connected to the battery, regenerative braking, a wall outlet and/or an electrical generator.

Additionally or alternatively, in this or other embodiments the battery is operably connected to the second compressor via an inverter.

In another embodiment, a refrigerated cargo container includes a cargo compartment and a transportation refrigeration unit in fluid communication with the cargo compartment. The transportation refrigeration unit includes an evaporator circulating a flow of refrigerant therethrough to cool a flow of supply air flowing from the cargo compartment over the evaporator, a first compressor operably connected to an engine and driven by the engine, a second compressor operably connected to a battery and driven by the battery. The first compressor and/or the second compressor are in fluid communication with the evaporator to compress the flow of refrigerant and configured and connected in parallel with one another. A condenser is in fluid communication with the evaporator and the first compressor and/or the second compressor.

Additionally or alternatively, in this or other embodiments the battery is operably connected to one or more electrically-operated components of the transportation refrigeration unit to drive operation of the one or more electrically-operated components, the one or more electrically-operated components include an evaporator fan, a condenser fan or a mechanical subcooler.

Additionally or alternatively, in this or other embodiments the battery is configured for recharging via operation of the engine.

Additionally or alternatively, in this or other embodiments the battery is rechargeable via one or more of one or more solar panels operably connected to the battery, regenerative braking, a wall outlet and/or an electrical generator.

Additionally or alternatively, in this or other embodiments the battery is operably connected to the second compressor via an inverter.

In yet another embodiment, a method of operating a transportation refrigeration unit includes flowing a liquid flow of refrigerant through an evaporator, directing a flow of supply air from a cargo compartment across the evaporator thus cooling the supply air and boiling the flow of refrigerant, routing the flow of refrigerant from the evaporator to a first compressor and/or a second compressor. The first compressor and the second compressor are arranged in parallel, and the first compressor is powered by operation of an engine operably connected to the first compressor and the second compressor is powered by a battery operably connected to the second compressor. The flow of refrigerant is injected into a first compressor inlet of the first compressor and/or a second compressor inlet of the second compressor. The flow of refrigerant is compressed at the first compressor and/or the second compressor, and the flow of refrigerant is directed to the evaporator via a condenser.

Additionally or alternatively, in this or other embodiments the battery is recharged via operation of the engine.

Additionally or alternatively, in this or other embodiments the battery is recharged via one or more of one or more solar panels operably connected to the battery, regenerative braking, a wall outlet or an electrical generator.

Additionally or alternatively, in this or other embodiments operation of the first compressor and/or the second compressor is stopped.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
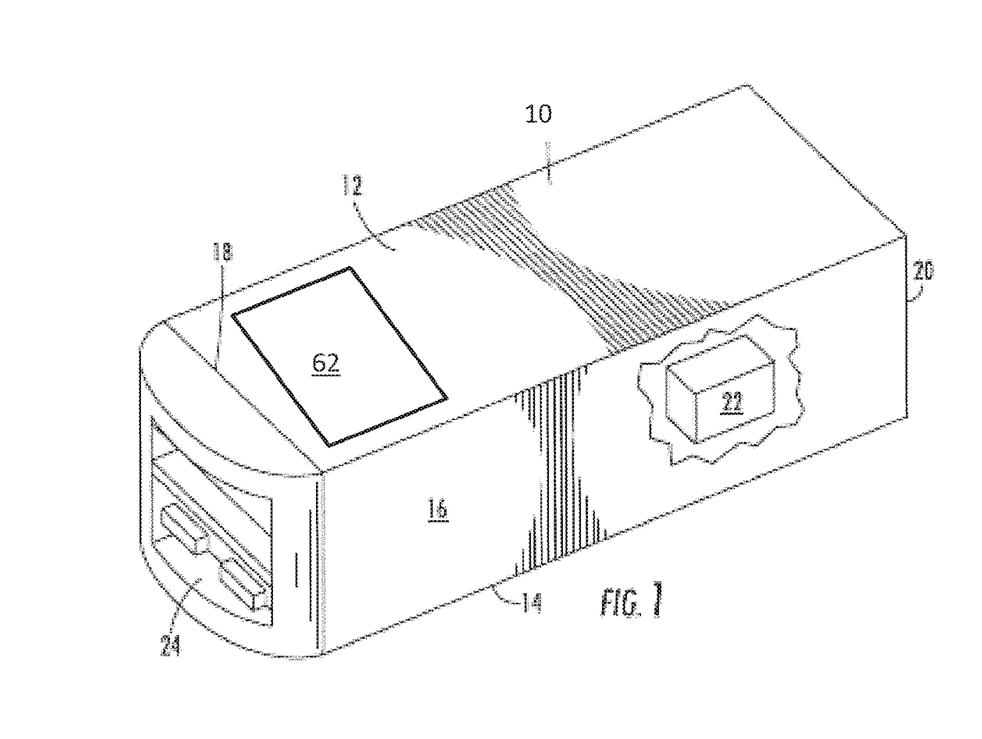
FIG. 1 is a schematic illustration of an embodiment of a refrigerated transportation cargo container.

Shown in FIG. 1 is an embodiment of a refrigerated cargo container 10. The cargo container 10 is formed into a generally rectangular construction, with a top wall 12, a directly opposed bottom wall 14, opposed side walls 16 and a front wall 18. The cargo container 10 further includes a door or doors (not shown) at a rear wall 20, opposite the front wall 18. The cargo container 10 is configured to maintain a cargo 22 located inside the cargo container 10 at a selected temperature through the use of a refrigeration unit 24 located at the container 10. The cargo container 10 is mobile and is utilized to transport the cargo 22 via, for example, a truck, a train or a ship. The refrigeration unit 24 is located at the front wall 18, and includes an evaporator 32 that receives an airflow 34 (shown in FIG. 2) from inside the cargo container 10 and cools it via thermal energy exchange between the airflow 34 and refrigerant flowing through the evaporator 32. The cooled airflow 34 is utilized to refrigerate the cargo compartment 10 to a selected temperature. In some embodiments, the selected temperature is in the range of about 30 to 50 degrees Fahrenheit for high or medium temperature refrigeration, while in other embodiments the selected temperature may be between 0 and −30 degrees Fahrenheit for frozen good refrigeration. It is to be appreciated that these temperatures are merely exemplary and that the refrigeration unit 24 described herein may be utilized to achieve a wide range of selected temperatures and further is readily switchable between selected temperatures.

Figure 2:
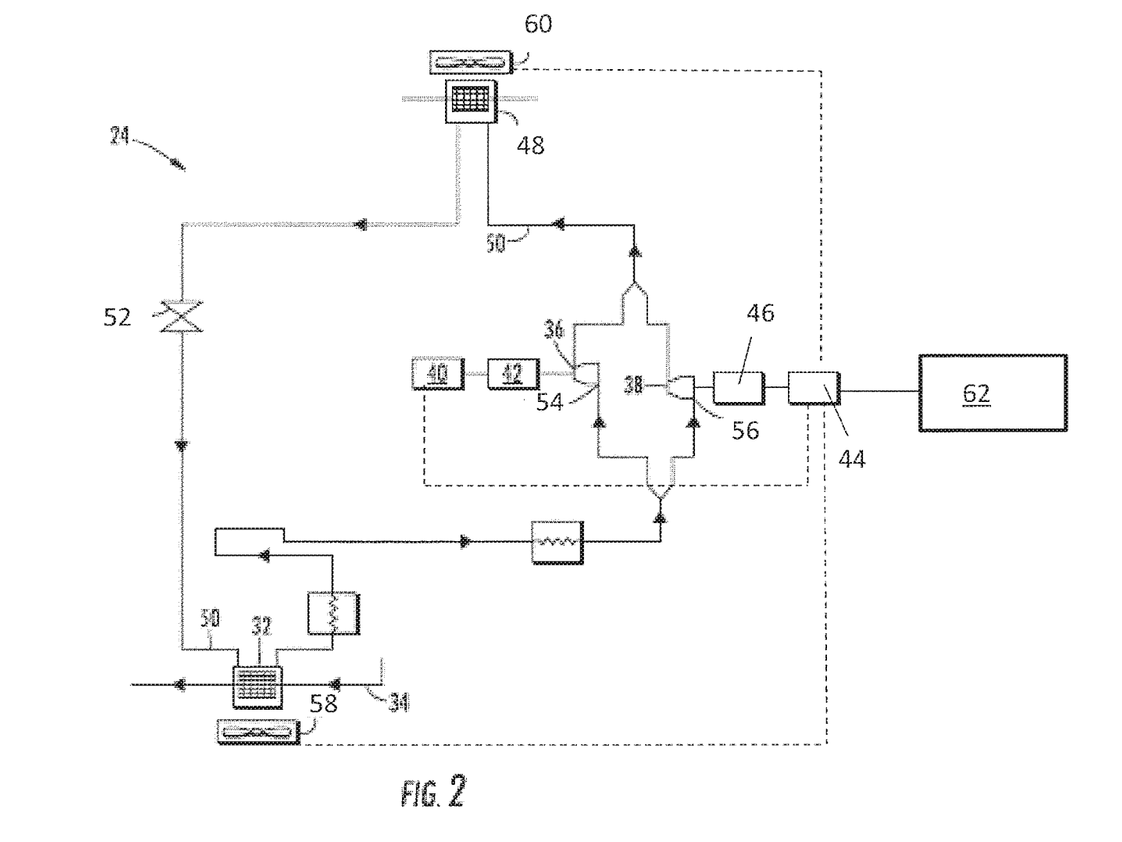
FIG. 2 is a schematic illustration of an embodiment of a refrigeration system for a refrigerated transportation cargo container.

Referring now to FIG. 2, a schematic illustration of an exemplary refrigeration unit 24 is shown. The refrigeration unit 24 includes two multiplexed compressors, first compressor 36 and second compressor 38 arranged in parallel. The compressors 36, 38 may both be vapor injection scroll compressors, or may be compressors of different types. The first compressor 36 is powered by a first power source, for example, a diesel-powered engine 40 either directly or via an intervening electrical generator 42 as shown to derive AC power to drive the first compressor 36. The second compressor 38 utilizes DC power from DC power storage unit, or battery 44. Battery 44 is either directly connected to the second compressor 38 such that the second compressor 38 operates utilizing DC power, or alternatively the second compressor 38 is connected to the battery 44 via an inverter 46 as shown in FIG. 2, such that the second compressor 38 utilizes AC power.

As stated above, the compressors 36, 38 are arranged in parallel and are fluidly connected to a condenser 48. The compressors 36, 38 compress a vapor refrigerant flow 50, and the refrigerant flow 50 changes phase into liquid at the condenser 48. The condenser 48 is fluidly connected to an expansion device 52. The expansion device 52 is fluidly connected to the evaporator 32, where the airflow 34 is cooled and the refrigerant flow 50 is boiled through thermal energy exchange at the evaporator 32. The vaporized refrigerant flow 50 is then returned to first compressor inlet 54 and second compressor inlet 56 of the respective compressors 36, 38.

Engine 40 may be operably connected to battery 44 to charge battery 44 while engine 40 also powers the first compressor 36 and/or when the first compressor 36 is not operating. In another embodiment, the battery is connected to one or more solar panels 62 located at, for example, the top wall 12 of the cargo container 10 (as shown in FIG. 1) to provide energy for charging the battery 44. The battery 44 may also be charged via other means, such as regenerative braking of a vehicle (not shown) to which the cargo container 10 is coupled. Further, in other embodiments, the battery may be charged via a wall outlet or an onboard electrical generator or a remotely located electrical generator.

Further, in some embodiments, the battery 44 is operably connected to an evaporator fan 58 of the evaporator 32, a condenser fan 60 of the condenser 48, and/or other electrical components of the refrigeration unit 24 or the cargo container 10 such as a mechanical subcooler (not shown) to drive operation of such components. The battery 44 may be utilized to power the second compressor 38 and/or other electrically operated components of the refrigeration unit.

Utilizing the battery 44 to drive the second compressor 38 increases operational flexibility of the refrigeration unit 24 as will be described below. During high-load operation of the refrigeration unit 24 such as a rapid pull down of temperature in the cargo compartment 10, both compressors 36, 38 are utilized, with the first compressor 36 powered by the engine 40 and the second compressor 38 powered by the battery 44. Both compressors 36, 38 operate to rapidly cool the cargo compartment 10.

In other modes of operation, such as when maintaining a set point temperature, operation of only one of the compressors 36, 38 may be needed. In such operational modes, operation of one of the compressors 36, 38 may be stopped. If operation of first compressor 36 is stopped, engine 40 may be stopped or alternatively engine 40 may be utilized at such time to recharge battery 44. In other modes of operation, operation of both compressors 36, 38 is stopped. Compressor 38 is then periodically operated utilizing battery 44 to maintain the set point temperature of the cargo compartment 10. Similarly, engine 40 may be utilized to drive the first compressor 36, while second compressor 38 is stopped and the battery 44 is utilized to drive the evaporator fan 58 and the condenser fan 60.

In another mode of operation, both compressors 36, 38 may be stopped and thus operation of engine 40 stopped, and battery 44 is utilized to drive evaporator fan 58 and/or condenser fan 60. Driving the evaporator fans alone will allow circulation of the cargo air to more easily maintain a homogenous set point temperature. In some embodiments, electrical power from the battery 44 is used to start the engine 40. Operating the second compressor 38 via the battery 44 allows the engine 40 to be operated only periodically to recharge the battery 44, or to operate the first compressor 36 periodically, thus reducing refrigeration unit 24 fuel consumption.

Figure 3:
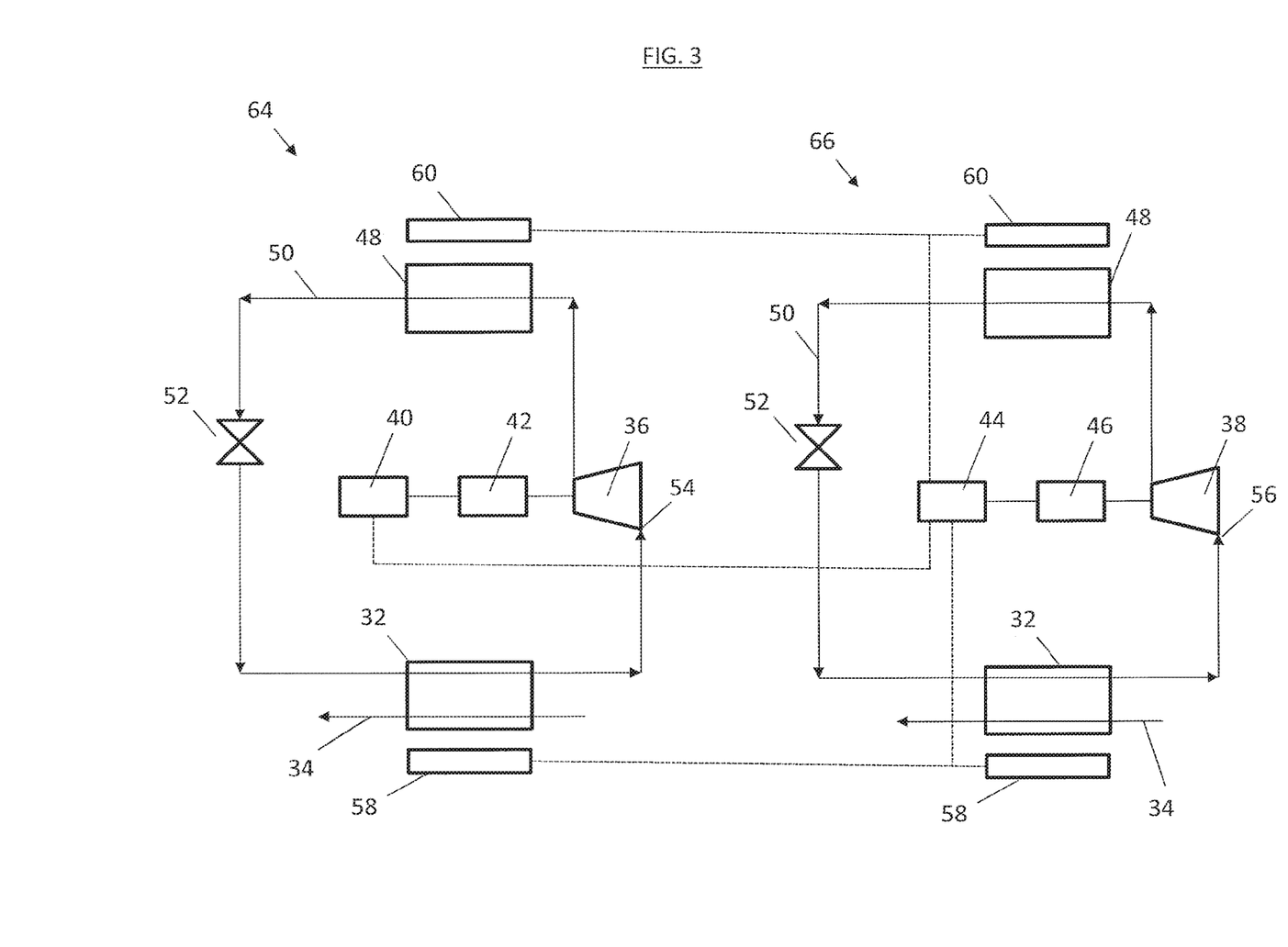
FIG. 3 is a schematic illustration of another embodiment of a refrigeration system for a refrigerated transportation cargo container.

In another embodiment, shown in FIG. 3, the compressors 36, 38 urge refrigerant flow 50 through two separate circuits 64 and 66, respectively. Each of circuits 64, 66 include a condenser 48, an expansion device 52 and an evaporator 32. The circuits 64 and 66 are independently operable depending on cooling required and charging status of the battery 44. Though the refrigerant flows 50 through the circuits 64 and 66 are independent, as in the embodiment of FIG. 2, the battery 44 may be utilized to drive electrical components of both circuits 64 and 66, such as the condenser fan 60 and the evaporator fan 58, and power from the battery 44 may be utilized to start the engine 40. Similarly, the engine 40 is utilized to recharge the battery 44.

Figure 4:
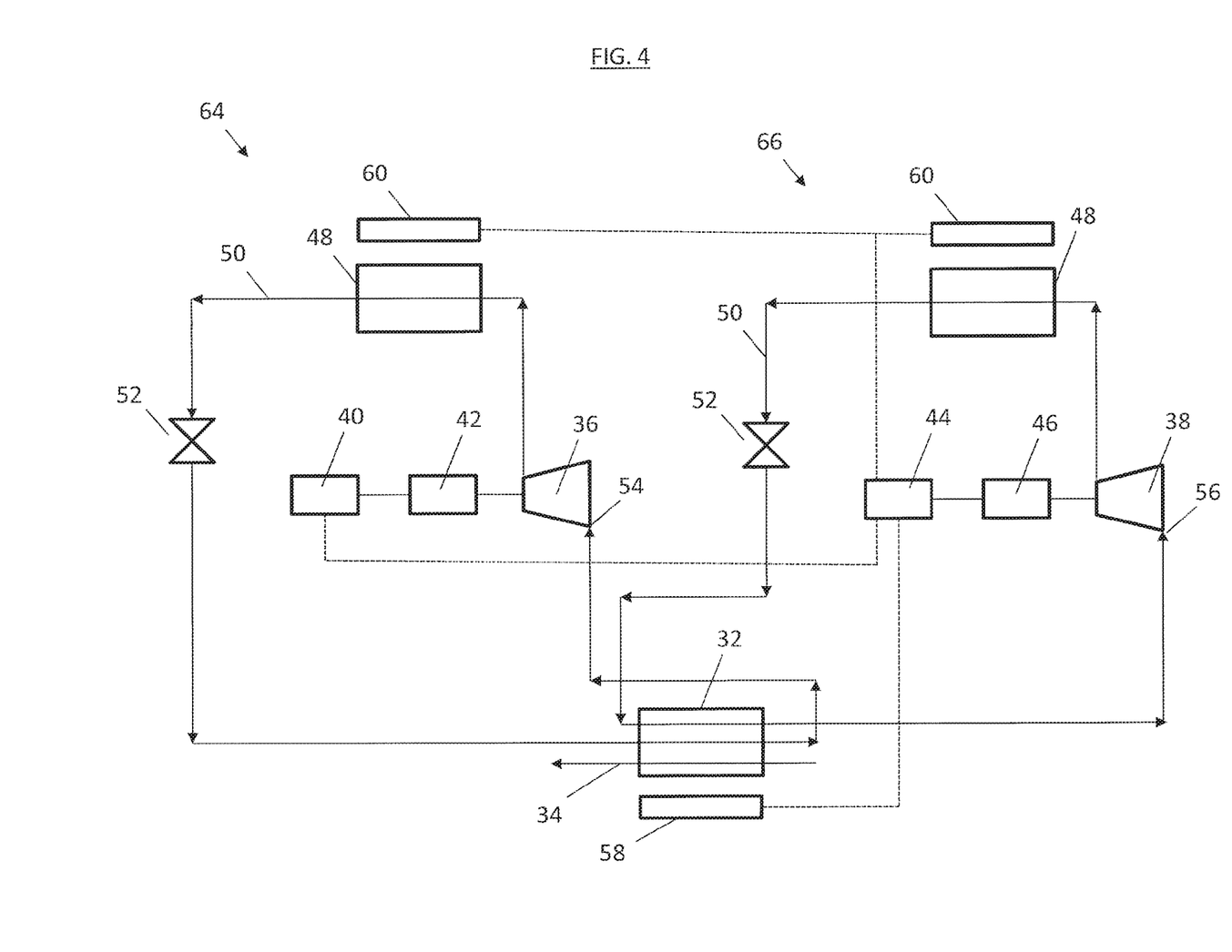
FIG. 4 is a schematic illustration of yet another embodiment of a refrigeration system for a refrigerated transportation cargo container.
Figure 5:
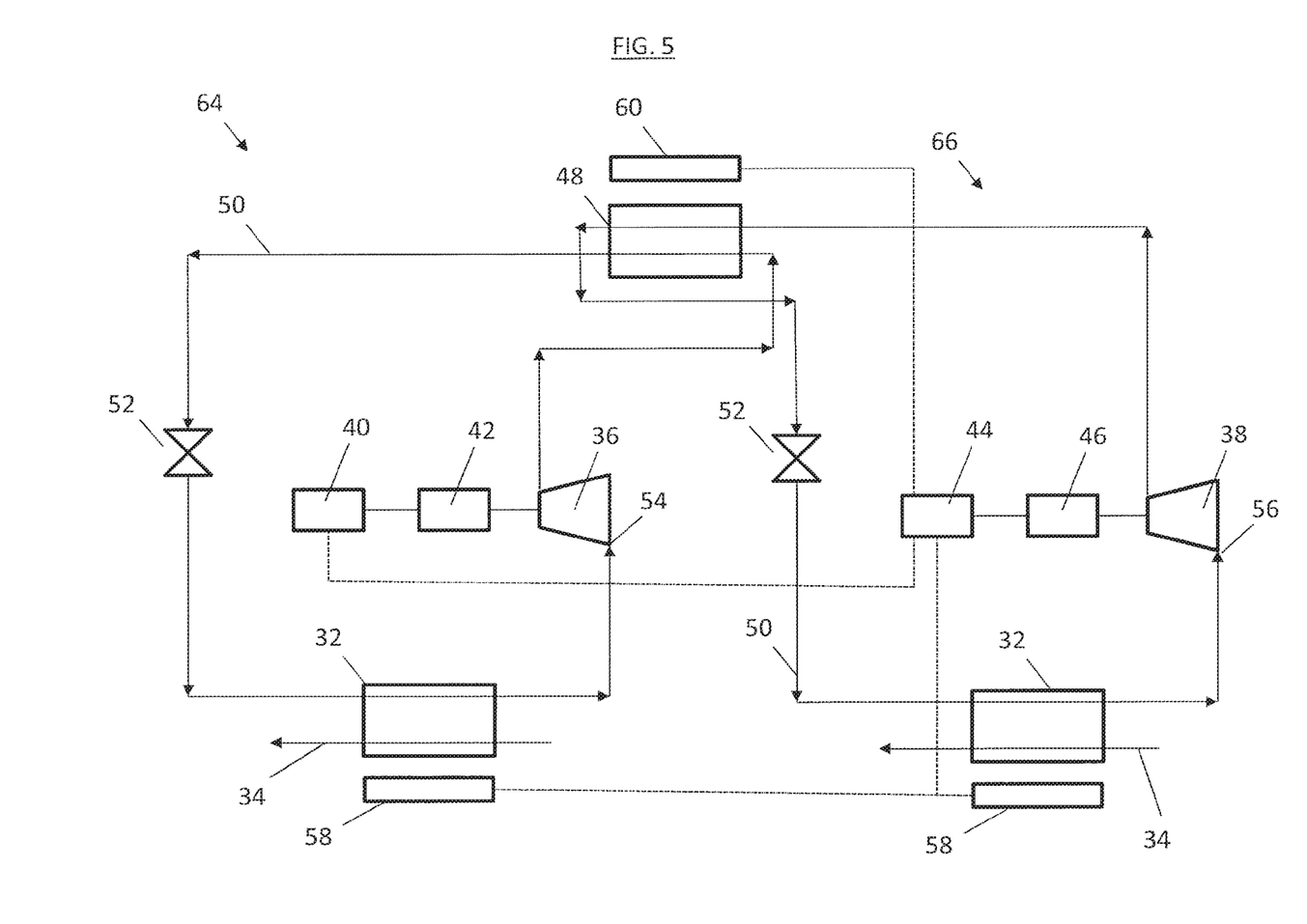
FIG. 5 is a schematic illustration of still another embodiment of a refrigeration system for a refrigerated transportation cargo container.

Referring now to FIG. 4, the refrigerant flows 50 through the compressors 36, 38 are independent, but circuits 64 and 66 share evaporator 32, while as shown in FIG. 5 the two circuits 64 and 66 share the condenser 48. Sharing of condenser 48 and/or evaporator 32 components between the two circuits saves space in the refrigeration system 24 and reduces components thereof.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A transportation refrigeration unit for a cargo compartment comprising:
    a first compressor operably connected to an engine and driven by the engine;
    a second compressor operably connected to a battery and driven by the battery, the first compressor and the second compressor urging refrigerant flow through two separate refrigerant circuits, a first refrigerant circuit of the two separate refrigerant circuits including a first evaporator, and a second refrigerant circuit of the two separate refrigerant circuits including a second evaporator separate and distinct from the first evaporator;
    wherein the two separate refrigerant circuits share a common condenser in fluid communication with both the first compressor and the second compressor;
    wherein the each of the first evaporator and the second evaporator are configured to receive an airflow from the cargo compartment and cool the airflow;
    wherein the battery is rechargeable via one or more of regenerative braking, and/or a wall outlet.

2. The transportation refrigeration unit of claim 1, wherein the battery is operably connected to one or more electrically-operated components of the transportation refrigeration unit to drive operation of the one or more components.

3. The transportation refrigeration unit of claim 2, wherein the one or more electrically-operated components include an evaporator fan or a condenser fan.

4. The transportation refrigeration unit of claim 1, wherein the battery is configured for recharging via operation of the engine.

5. The transportation refrigeration unit of claim 1, wherein the battery is operably connected to the second compressor via an inverter.

6. A refrigerated cargo container comprising:
    a cargo compartment; and
    a transportation refrigeration unit in fluid communication with the cargo compartment including:
        a first compressor operably connected to an engine and driven by the engine;
        a second compressor operably connected to a battery and driven by the battery, the first compressor and the second compressor urging refrigerant flow through two separate refrigerant circuits, the separate refrigerant circuits each including an evaporator to cool a flow of supply air flowing from the cargo compartment over the evaporator, a first refrigerant circuit of the two separate refrigerant circuits including a first evaporator, and a second refrigerant circuit of the two separate refrigerant circuits including a second evaporator separate and distinct from the first evaporator;
        wherein the two separate refrigerant circuits share a common condenser in fluid communication with both the first compressor and the second compressor;

wherein each of the first evaporator and the second evaporator are configured to receive an airflow from the cargo compartment and cool the airflow;

wherein the battery is rechargeable via one or more of regenerative braking and/or a wall outlet.

7. The refrigerated cargo container of claim 6, wherein the battery is operably connected to one or more electrically-operated components of the transportation refrigeration unit to drive operation of the one or more electrically-operated components, the one or more electrically-operated components include an evaporator fang or a condenser fan.

8. The refrigerated cargo container of claim 6, wherein the battery is configured for recharging via operation of the engine.

9. The refrigerated cargo container of claim 6, wherein the battery is operably connected to the second compressor via an inverter.

10. A method of operating a transportation refrigeration unit comprising:

routing a first flow of refrigerant to a first compressor and a second flow of refrigerant to a second compressor through two separate refrigerant circuits, the first compressor powered by operation of an engine operably connected to the first compressor and the second compressor powered by a battery operably connected to the second compressor;

injecting the first flow of refrigerant into a first compressor inlet of the first compressor and the second flow of refrigerant into a second compressor inlet of the second compressor;

compressing the first flow of refrigerant at the first compressor and the second flow of refrigerant at the second compressor;

directing the first flow of refrigerant to a first evaporator and the second flow of refrigerant to a second evaporator separate and distinct from the first evaporator via a common condenser and an expansion device;

receiving an airflow from a cargo compartment at the evaporator and cooling the airflow at the evaporator;

recharging the battery via one or more of regenerative braking and/or a wall outlet.

11. The method of claim 10, further comprising recharging the battery via operation of the engine.

\* \* \* \* \*